United States Patent
Carro et al.

(10) Patent No.: US 8,254,962 B2
(45) Date of Patent: *Aug. 28, 2012

(54) SCHEDULING TASKS DYNAMICALLY DEPENDING ON THE LOCATION OF A MOBILE USER

(75) Inventors: Fernando Incertis Carro, Valencia (ES); Amr Mebed, Giza (EG)

(73) Assignee: International Business Machines Corporation, Armonk, NY (US)

( * ) Notice: Subject to any disclaimer, the term of this patent is extended or adjusted under 35 U.S.C. 154(b) by 661 days.

This patent is subject to a terminal disclaimer.

(21) Appl. No.: 12/185,912

(22) Filed: Aug. 5, 2008

(65) Prior Publication Data

US 2008/0311929 A1 Dec. 18, 2008

Related U.S. Application Data

(63) Continuation of application No. 11/225,792, filed on Sep. 13, 2005, now Pat. No. 7,499,715.

(30) Foreign Application Priority Data

Sep. 27, 2004 (EP) ..................................... 04300627

(51) Int. Cl.
*H04M 3/00* (2006.01)
*H04W 24/00* (2009.01)

(52) U.S. Cl. ................... 455/456.3; 455/418; 455/456.1

(58) Field of Classification Search ............... 455/404.2, 455/414.1, 414.3, 418–420, 423–425, 456.1–456.6, 455/457–459, 512, 514, 517–518, 550.1, 455/556.2, 560–561, 558, 565; 708/111–112, 708/130–132; 701/200–204, 207, 211, 213; 705/7.13, 7.18–7.19, 7.21, 7.26

See application file for complete search history.

(56) References Cited

U.S. PATENT DOCUMENTS

| | | | |
|---|---|---|---|
| 5,654,908 A | 8/1997 | Yokoyama | 708/109 |
| 6,182,110 B1 * | 1/2001 | Barroux | 709/201 |
| 6,381,580 B1 | 4/2002 | Levinson | 705/8 |
| 6,411,899 B2 * | 6/2002 | Dussell et al. | 701/211 |
| 6,564,382 B2 * | 5/2003 | Duquesnois et al. | 725/100 |
| 6,950,662 B2 * | 9/2005 | Kumar | 455/456.3 |
| 7,113,538 B1 * | 9/2006 | Chen et al. | 375/150 |
| 7,174,301 B2 | 2/2007 | Florance et al. | 705/1 |
| 7,260,588 B2 * | 8/2007 | Werner | 707/752 |
| 7,499,715 B2 * | 3/2009 | Carro et al. | 455/456.3 |
| 2002/0038234 A1 | 3/2002 | Fu et al. | |
| 2002/0068583 A1 | 6/2002 | Murray | 455/456 |
| 2003/0023489 A1 | 1/2003 | McGuire et al. | 705/14 |
| 2003/0060214 A1 | 3/2003 | Hendrey et al. | 455/456 |
| 2003/0224762 A1 | 12/2003 | Lau et al. | 455/412.2 |

(Continued)

FOREIGN PATENT DOCUMENTS
WO WO 2004/043100 5/2004

*Primary Examiner* — Meless Zewdu
(74) *Attorney, Agent, or Firm* — Winstead, P.C.

(57) ABSTRACT

Systems, methods, and computer program products for automatically scheduling and rescheduling tasks based on predictable, observable, or measurable events, and on conditions occurring in the vicinity of the user's location. A plurality of tasks are defined by the user. Events or conditions depending on the user's location and affecting the opportunity or the feasibility of the tasks are associated with these tasks. Task schedules are assigned, merged, or permuted to dynamically provide the user with a feasible and convenient agenda.

23 Claims, 7 Drawing Sheets

U.S. PATENT DOCUMENTS

| | | | |
|---|---|---|---|
| 2004/0203847 A1 | 10/2004 | Knauerhase et al. | 455/456.1 |
| 2004/0203863 A1* | 10/2004 | Huomo | 455/456.1 |
| 2004/0230685 A1* | 11/2004 | Seligmann | 709/228 |
| 2005/0114191 A1* | 5/2005 | Atkin et al. | 705/8 |
| 2006/0058948 A1* | 3/2006 | Blass et al. | 701/207 |
| 2006/0121912 A1 | 6/2006 | Borjesson | 455/456.1 |

* cited by examiner

SCHEDULING TASKS DYNAMICALLY DEPENDING ON THE LOCATION OF A MOBILE USER

CROSS REFERENCE TO RELATED APPLICATIONS

The present application is a continuation application of pending U.S. patent application Ser. No. 11/225,792, which was filed on Sep. 13, 2005, which is assigned to the assignee of the present invention. The present application claims priority benefits to U.S. patent application Ser. No. 11/225,792. U.S. patent application Ser. No. 11/225,792 claims priority under 35 U.S.C. §119(a) to European Patent Application No. 04300627.9 filed Sep. 27, 2004.

FIELD OF THE INVENTION

The present invention relates to personal electronic calendars, schedulers, and tasking systems, and more particularly to a method, system, and computer program product for automatically scheduling tasks according to events or conditions occurring in the vicinity of a mobile user.

BACKGROUND

Portable computing devices such as cellular phones, hand held computers, palm devices, and the like have become increasingly popular in recent years. The technology has advanced to such a degree that people can now access the Internet with wireless technology such as a cellular phone or personal digital assistant (PDA), and can have access to content especially tailored for small portable devices.

With the increased reliance on mobile, pervasive computing, software applications designed to enhance the efficiency, productivity, or comfort of mobile users have evolved. Some of the most popular mobile applications for such wireless devices such as mobile phones or WAP (Wireless Application Protocol) include personal information managers (PIMs), entertainment programs, financial services, and commercial services.

An Increasing number of applications in the field of mobile communications use information related to the position of mobile communication devices. For example, emergency services require the location of the caller. Commercial applications, too, make use of a caller's location in order to determine the services or information to offer. Some applications simply provide the caller with information about the nearest shop, restaurant, or gas station. Other applications are complex, for example billing systems, for differentially charging a user for a service depending on his or her whereabouts.

To provide location-based services to a mobile user, the location of the user must be determined. In the field of mobile telephony, for example, perhaps the most basic information concerning the position of the mobile device is the location of the cell or sector radio mast which is handling the call, which may be, for example, derived from cell or transceiver identification code, or cell-ID. This mast is usually the closest radio mast. Such an estimate can be further refined according to signal strength or direction, if directional antennae are employed. Various alternatives may offer more accuracy, such as triangulation based on directional signals from several masts, or on distance estimates derived from signal strengths, or on transmission times to several masts. Even more accurate position information may be available from the mobile device itself if the mobile device is equipped with a Global Positioning System (GPS) receiver. However, the use of GPS requires additional hardware and software to receive the required signals from the geostationary GPS satellites.

One particularly important type of personal application that has emerged is the electronic calendar, or personal information and time manager. Lotus Organizer™ (Lotus Organizer is a registered trademark of Lotus Development Corporation) is an example of a popular electronic, personal information, and time manager for scheduling appointments, maintaining address lists, managing contacts, tracking to-dos, and more. Lotus Organizer's™ daybook-style user interface makes it easy to use; there are, however, practical and functional limitations to its capabilities.

For example, maintaining updated calendar and agenda schedules requires heavy interactions from the user to enter data. Other electronic calendars exist and also are subject to similar functional limitations, as schedules may either fail to accommodate rules or conditions beyond rudimentary duration requirements or may require significant manual input to handle exceptions or variable conditions. For a mobile user, location is an important factor, in addition to time. A mobile user may schedule tasks that are to be executed at a particular time and place, regularly, or upon the occurrence of other events or under certain environmental conditions. Consequently, the scheduling of daily tasks becomes a more complex matter for a nomadic, mobile user, because convenient times for performing many activities are affected by location-related events or conditions.

Generally speaking, there are two main types of schedules: time-based schedules, which may be periodic or prefixed in time, and rule-based schedules, which may be governed by formulas, algorithms, sensed conditions, and the like. There are also event-driven tasks, which may become active under certain events or conditions.

As a mobile user goes to different places, performs different activities at different locations, and communicates with various remote locations, the scheduling of daily user activities may be affected, and may be modified by the occurrence of many different possible location-related events or conditions. Some events or conditions are deterministic and predictable; most of them, however, even those observable and measurable, are essentially random and unpredictable. In fact, in the course of a day, a mobile user may be subject to independent, predictable deterministic, location dependent events, such as sunrise and sunset times; to events that are unknown by the user, even if these events are programmed in advance, such as the occurrence of a public event in a city; and, perhaps in many more cases, to uncertain or random events, such as traffic jams or other common natural conditions, such as adverse weather.

For example, consider the case of a person arriving late at night to a remote fishing resort. He may wish to wake-up the next day at dawn, say 30 minutes before sunrise, unless the weather is unsuitable for sailing or fishing, in which case he might prefer not to be awakened at this early time in the morning, but instead to sleep until 8:00 a.m. This simple example illustrates how the scheduling of a simple user activity, such as "wake me up tomorrow morning," may depend on both a predictable physical phenomenon such as the time of sunrise for a particular date and location, and an uncertain phenomenon such as the weather conditions at the user's location. To cope with such uncertainty, mobile users frequently opt for conservative schedules based on the worst case, and frequently adapt or modify already planed schedules. In many cases, these modifications are based on outdated or incomplete knowledge of prevailing events or conditions.

Thus, there is a need to exploit the wireless computing technology more fully, in order to extend the utility of location based services to encompass the opportunistic scheduling of mobile users' activities; there is a need to provide mobile users with the capability of automatically scheduling, depending on particular events or conditions that may occur at the actual user location, tasks for which time schedules have not been yet assigned; and there is a need to provide mobile users with the capability of automatically rescheduling, altering, or canceling previously scheduled tasks, depending on information gathered about the occurrence of certain events or conditions related to the user's location.

SUMMARY

The present invention includes systems, methods, and computer program products for scheduling and rescheduling tasks or activities on a calendar or agenda of a mobile user based on events (e.g., sunset time) or conditions (e.g., traffic conditions or meteorological conditions) related to the mobile user's location.

A system according to the present invention may include: a location determination system configured to determine a geographic location of a user, an automated personal notification system configured to automatically transmit a structured, personalized, user environment notification message, which may be based on the geographic location of the user; and an automated personal scheduling system that parses and processes, on the user's terminal, the received user environment notification messages used to schedule or reschedule the user's tasks.

In another aspect, the present invention includes a method and computer program product, for use in a mobile user device, for automatically scheduling and rescheduling tasks based on information (computed or acquired) about the current user's physical location. The method may include: starting the process of scheduling tasks as a result of a user input or an event; if the user's location has changed, determining the new location coordinates; for each task condition, determining the task parameters related to the user's location and determining, according these task parameters, whether or not the task condition is met; scheduling tasks for which the associated conditions are met; rescheduling time for conflicting tasks based on the priority assigned to each task; and performing the scheduled tasks on time.

BRIEF DESCRIPTION OF THE DRAWINGS

The foregoing, together with other objects, features, and advantages of this invention can be better appreciated with reference to the following specification, claims and drawings, wherein:

DETAILED DESCRIPTION

Figure 1:
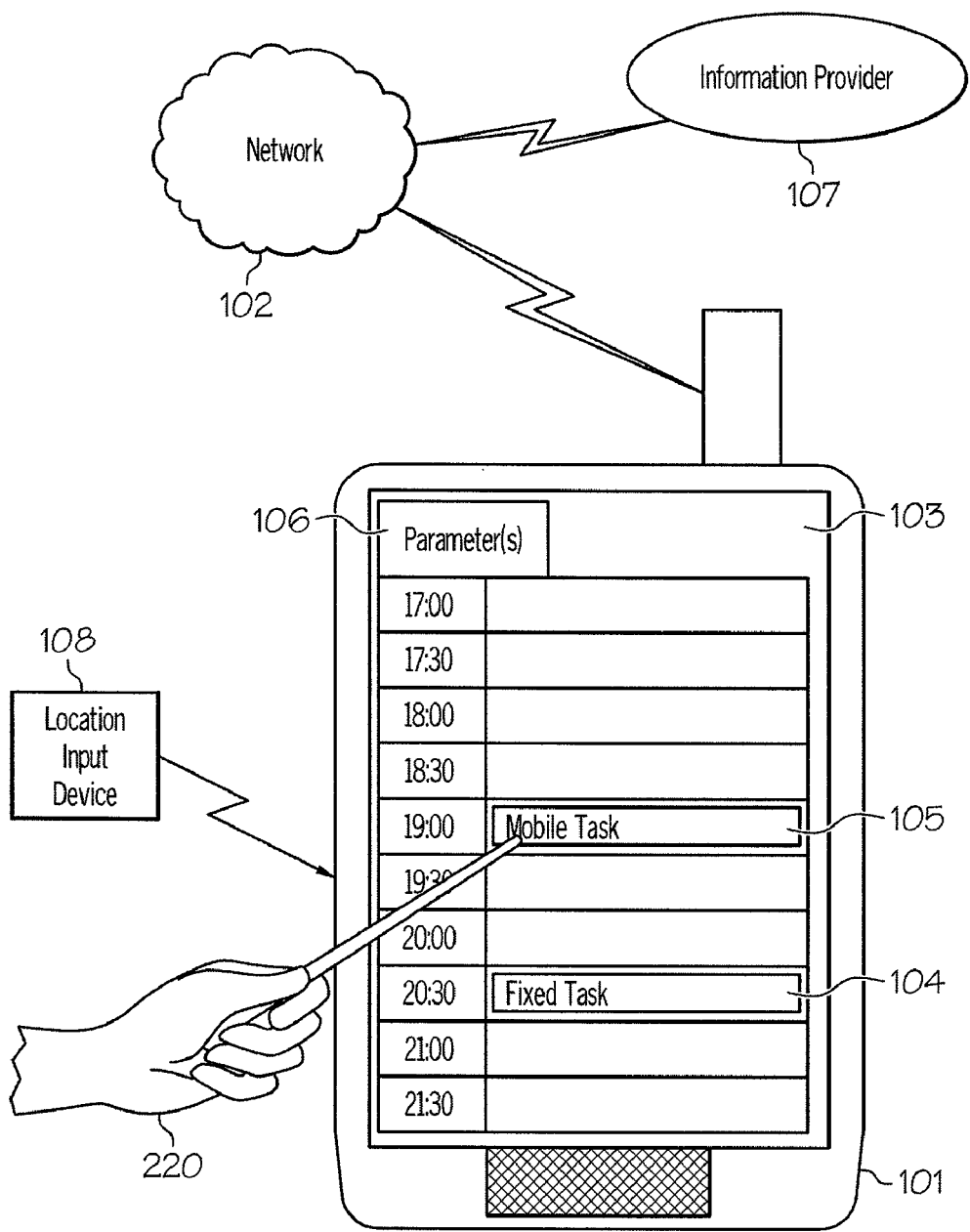
FIG. 1 shows components of the invention.

As shown in FIG. 1, the present invention is directed to a system and method for automatically scheduling tasks (activities) of a mobile user based on information (computed or acquired) related to events or conditions that depend on the mobile user's location. In a preferred embodiment of the present invention, a user (120) using both a mobile device (101) and a personal scheduling management system (103), can define tasks (activities), which may be fixed (time assigned) or mobile (dependent on the user's physical location); automatically (e.g, when the user moves to a new location), or even manually (i.e., under the user's request) adjust or reschedule defined tasks; and view the automatically adjusted schedule of tasks.

Fixed tasks (104) are time assigned tasks that have a fixed starting time and duration such as meetings, phone calls, and the like. Mobile tasks (105) are tasks that depend on the user's physical location. The starting time of a mobile task may be based on the user's physical location and on information that is computed or information that is acquired from an information provider (107) via a communications data network (102). The duration of a mobile task can be computed, acquired, or fixed. Examples of mobile tasks include sunrise or sunset time programmed activities, Islamic prayer times, and the like.

A mobile device (101) may identify its current physical location from parameters (106) transmitted to it via the communications network (102). For example, the mobile device can use the CELL ID of a GSM network, or a OPS system (108). The current location parameters (106) or the name of the corresponding physical location can then be displayed (106) on the mobile device (101).

When the user moves from one place to another, the personal scheduling management system reschedules the mobile tasks according to the place where the user is situated. The personal scheduling management system then automatically reschedules conflicting activities based on their priorities so that a newly adjusted schedule of tasks is created.

FIGS. 2 through 5 illustrate a first scenario in which a personal scheduling management system carried by an English tourist traveling in the Middle East automatically adjusts schedules based on the locations visited. The tourist intends to travel to Dubai, United Arab Emirates and then to Cairo, Egypt. In each location, the tourist wants to take photos of the sunset, and call home to England at around 16:00 GMT every day. The tourist does not like to go out in hot weather, and so determines to take sunset pictures only if the ambient temperature is under 30 degrees Celsius.

Figure 2:
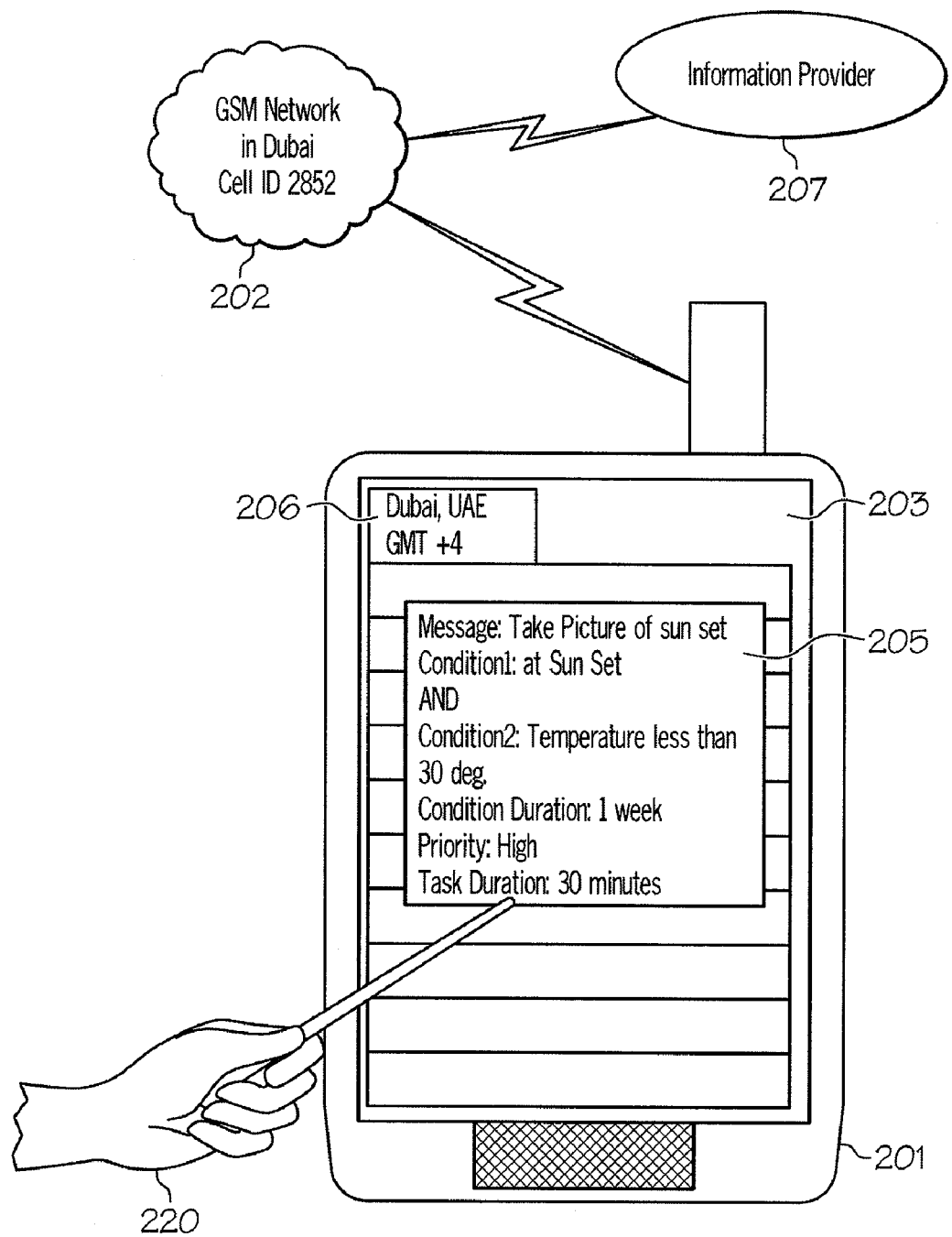
FIG. 2 shows how a user may define a task; for instance a task scheduled to be performed at sunset where the user is situated.

FIG. 2 shows the tourist (i.e., the user) (220) with a mobile device (201) together with a personal scheduling management system (203). In the present example, the user defines the mobile task (205) with the following parameters:

"Message" that is the text that will be displayed to identify this task to the user.

"Conditions" are the set of conditions that have to be met in order to schedule the task. In the present case, the conditions required to perform this task are the following: sunset at the place where the user is situated, and an ambient temperature below 30 degrees Celsius.

"Condition duration" is the validity of the conditions from the time of their creation. In this example, the conditions apply only for the next week.

"Priority" of the task. Different scheduling actions can be taken on a task depending on its priority. For example if there is a time conflict between tasks, then a task with a higher priority may be given a better chance to be scheduled on time than a task of a lower priority, which may be shifted to a later time.

"Task duration" is the validity of the task itself, while the above "Conditions" are met (in the present case when the sun sets and when the ambient temperature is under 30 degrees Celsius, the task is scheduled for a time period of 30 minutes).

In order to complete the schedule of the mobile task "take picture at sunset," the physical location of the user has to be known since sunset and outdoor temperature are both dependent on the current physical location of the user. In this example, the mobile device (201) is connected to a GSM network (202). From the GSM network, the mobile device retrieves information about the current country and the CELL-ID of the current location. From a database which associates CELL-IDs and locations, different location parameters (206) can be retrieved. The location parameters may include, for example, location name, longitude and latitude, and location time zone.

Based on the current location parameters, the sunset time can be calculated. The weather information for the current location can be retrieved from an information provider (207) via the communication network (202). Thus it is possible to determine whether the conditions of the task (sunset and ambient temperature under 30 degrees Celsius) are met or not. If the task conditions are met, then the task is scheduled as shown in FIG. 3.

Figure 3:
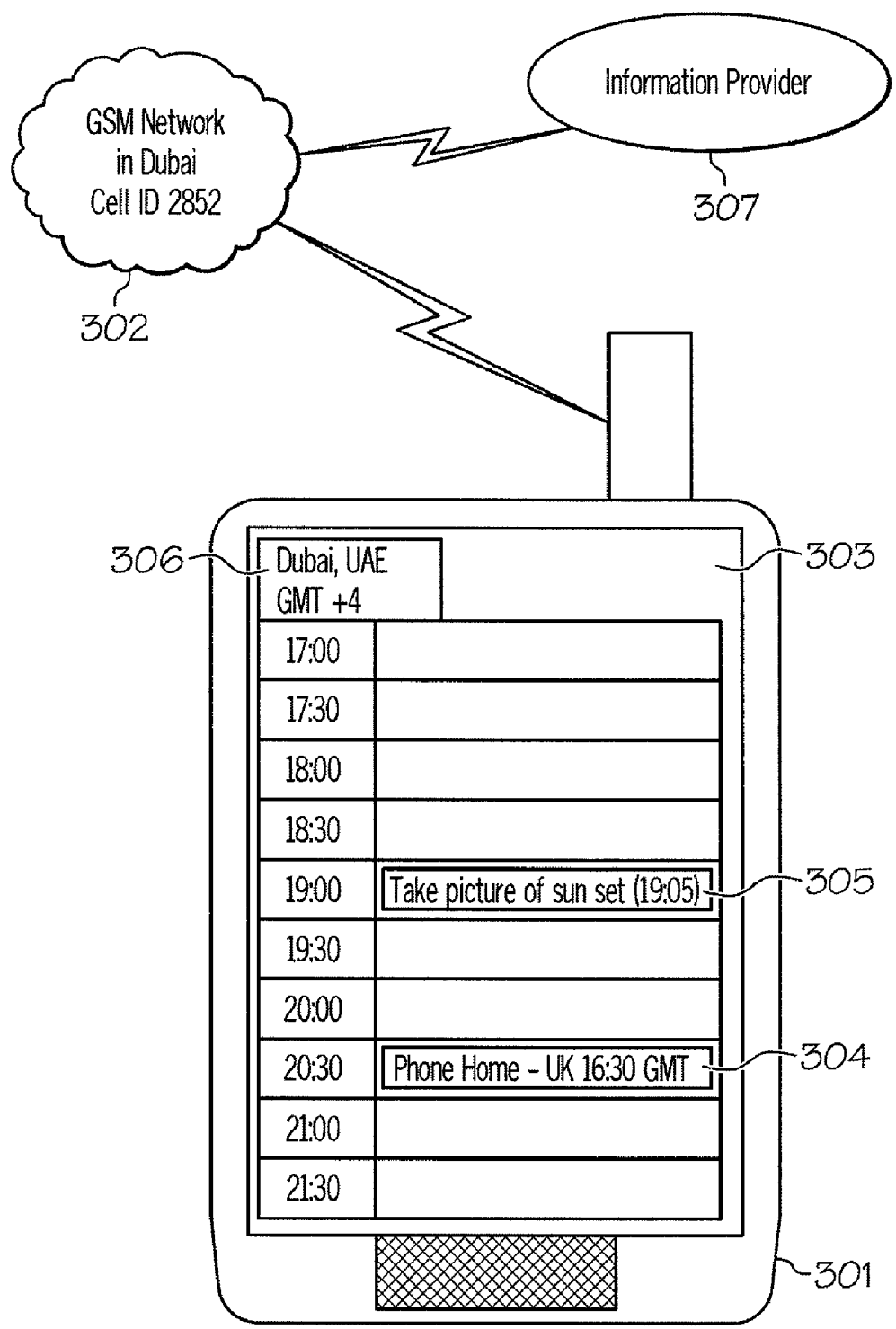
FIG. 3 shows a user's calendar comprising mobile and fixed tasks scheduled by the user.

FIG. 3 shows that the user has already defined another task (304), namely to "phone home." In this case, the task is a "local time fixed task," which is a task with a fixed starting time and duration. In the present example, this task has been scheduled to take place daily at 16:30 GMT.

FIG. 3 shows the scheduling by the personal scheduling management system of both the fixed task (304) and the mobile task (305). The fixed task (304) is, in the present example, for the tourist to phone home at around 16:30 GMT, which is 20:30 in Dubai local time. The mobile task (305) is to take a picture of sunset. The process to define this task has already been described in FIG. 2. In this example, in Dubai where the user is located, the sunset will be at around 19:05 and the ambient temperature is under the limit of 30 degrees Celsius; consequently, the task is scheduled to take place accordingly, as shown in the figure.

Figure 4:
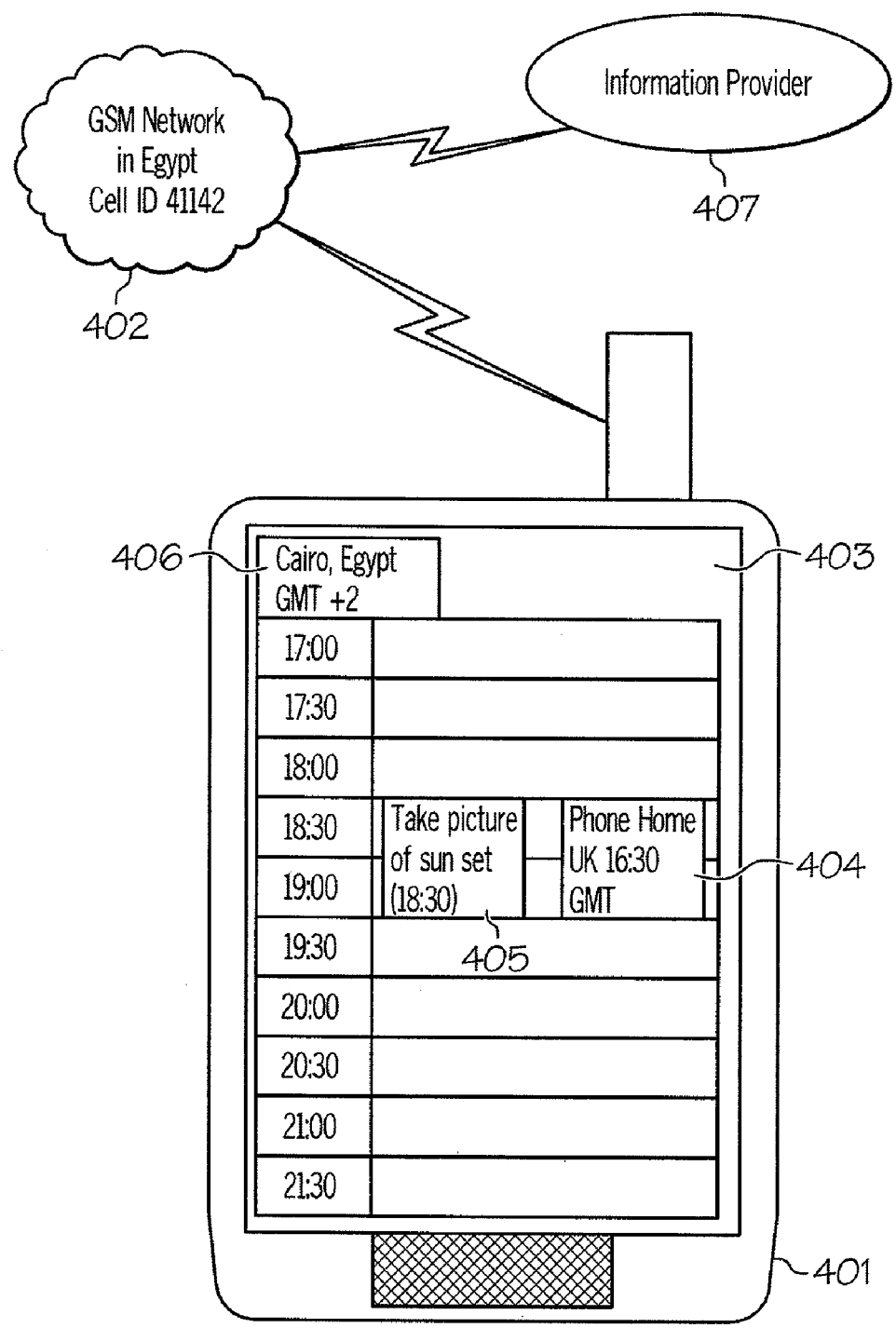
FIG. 4 illustrates how, when a user moves to a new location, the schedule of both mobile and fixed tasks is automatically adjusted based on the new location and new time zone.

FIG. 4 shows that the user has traveled from Dubai to Cairo, Egypt. The aforementioned tasks are still valid. When the user reaches Cairo, the mobile device (401) detects a different GSM network CELL-ID (402), and deduces the new location. This new situation leads the scheduling management system to reschedule the tasks according to the new location. The scheduling management system checks the validity (conditions) of each task in order to reschedule the tasks at the new location with the programmed rules and priorities.

For the mobile task "Take picture at sunset" in Cairo, the scheduling management system:

Gets the CELL-ID from the GSM Network (402) to determine the user's location.

Retrieves the location parameters for the current location, which may include longitude, latitude, and time zone. These parameters may be used to compute the sunset time in Cairo, which is a condition for scheduling the task. In the example illustrated in FIG. 4, for today, the computed sunset time for Cairo is 18:30 local (i.e., Cairo city) time.

Retrieves weather information about Cairo's region from an information provider (407). Assuming that the temperature is under 30 degrees Celsius, then the task "Take picture at sunset" is scheduled for 18:30, Cairo local time (405).

FIG. 4 also shows how the fixed task "phone home" (404), which must take place daily at 16:30 GMT, is scheduled at 18:30 Cairo local time. In this case, both the mobile (405) task (which depends on the location and date) and the fixed (404) task (fixed to a specific local time) are scheduled, due to the user mobility, at the same local time, which results in a scheduling conflict.

Figure 5:
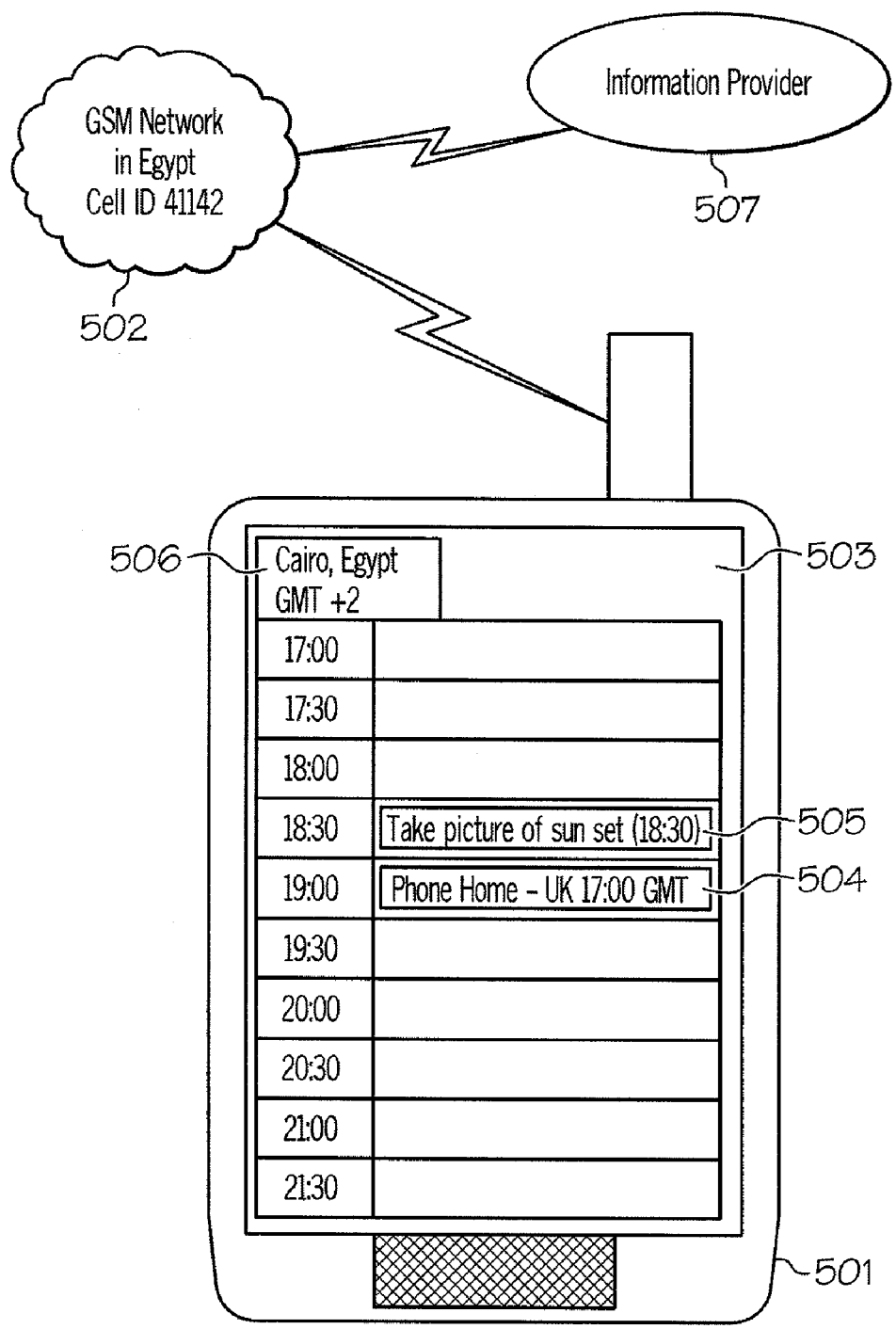
FIG. 5 shows a view of a user's calendar after the automatic reschedule of conflicting tasks.

As shown in FIG. 5, in order to overcome the scheduling conflict, the scheduling management system of the invention reschedules the tasks according to their respective priorities. If the user has assigned a "Priority: High" (205) to the mobile task (505), the mobile task is scheduled to take place at the computed time and the fixed task (504), which has a lower priority, is shifted to a later time. The automatic rescheduling of the tasks leads to the following results: the "Take picture of sunset" task (505) is scheduled to take place at 18:30, Cairo local time, and the "phone home" (504) task is scheduled to take place at 19:00, Cairo local time.

When the user travels from Dubai to Cairo, the personal scheduling management system monitors and automatically reschedules all the user's tasks according to the user's current location and conditions.

Figure 6:
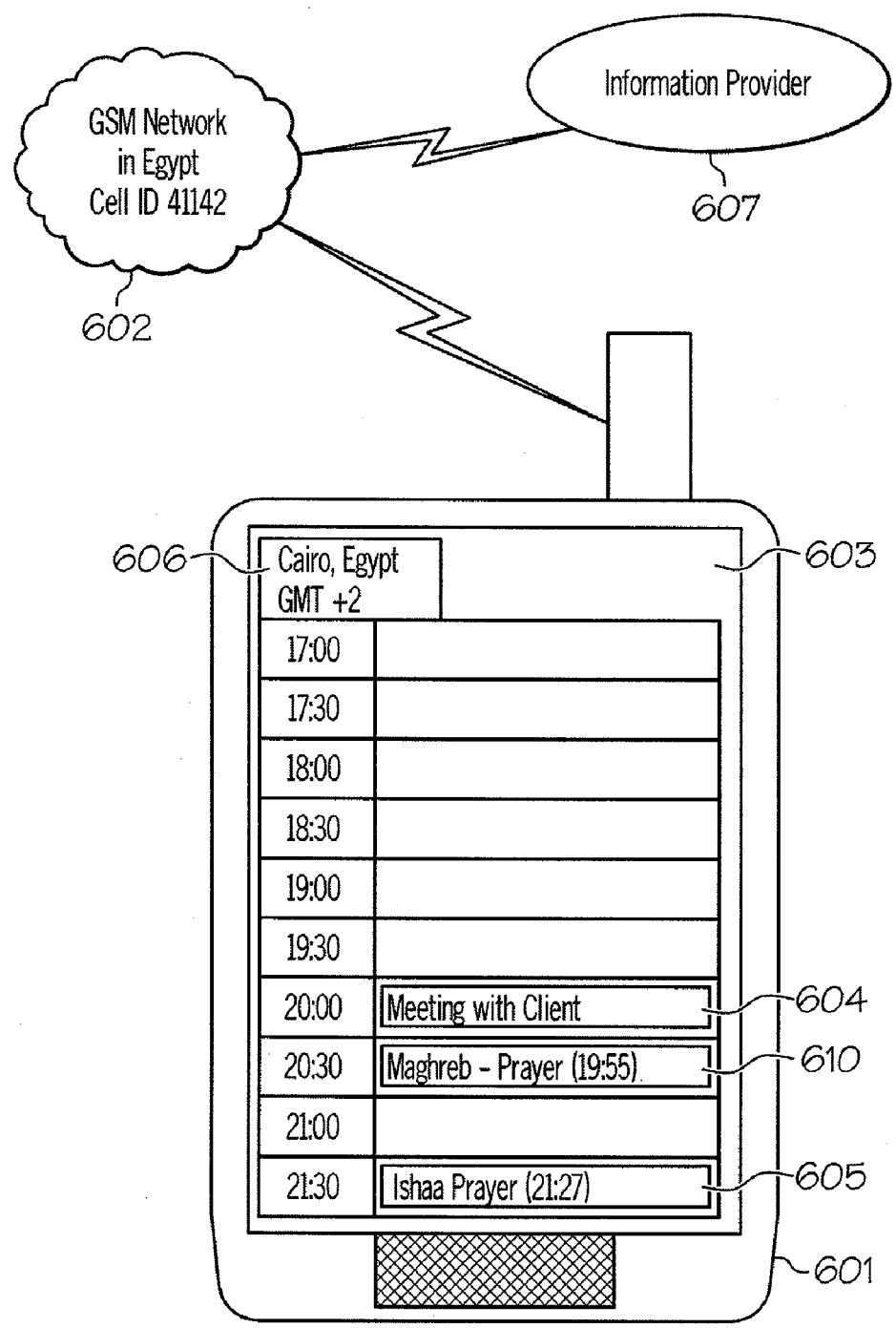
FIG. 6 shows the scheduling of Islamic prayer times for a mobile user.

FIG. 6 illustrates another application of the invention, in which the disclosed personal scheduling management system is used to automatically reschedule astronomically determined daily tasks such as Islamic prayer times.

There are five prayers per day in Islam. Each prayer has a starting and ending "time slot," which is the time period in which the prayer must be performed. The time slot for each prayer is defined according to the position of the sun. For example the Maghreb prayer takes place at sunset, when the angle of the sun is around 0.83 degrees under the horizon, while the next prayer, the Ishaa prayer, takes place after sunset, when the angle of the sun reaches 17.5 under the horizon. The time slot for the Maghreb prayer is thus from the time the sun reaches 0.833 degrees till the sun reaches 17.5 degrees under the horizon (Ishaa prayer time). The prayer time depends on the sun position, which varies with dependence upon the date and the location of the person on the earth.

The personal scheduling management system defines the prayer times as mobile tasks. Each mobile tasks has a time slot in which the task must be completed; this time slot is the "task condition duration" (for example, the Maghreb prayer can be done from 19:55 till 21:27 from a given location). The prayer itself is about ten minutes long ("task duration"). In the example shown in this figure, the user has allowed the personal management system to automatically schedule the prayer in order to fit with the daily tasks of the user.

FIG. 6 shows that the user has scheduled a meeting with a client at 20:00 for a duration of half an hour. This overlaps with the Maghreb prayer which starts at 19:55. Since the Maghreb prayer can be performed any time until 21:27 (which is the time of the next prayer) and the meeting is scheduled to conclude at 20:30, the personal management system will automatically schedule the Maghreb prayer to take place after the meeting ends. The above scenario applies when the user moves from one location to the other and the prayer times change according to the new physical location.

In this case, the personal management system automatically updates the schedule of prayers according to the new physical location, to fit with other pre-scheduled tasks.

Figure 7:
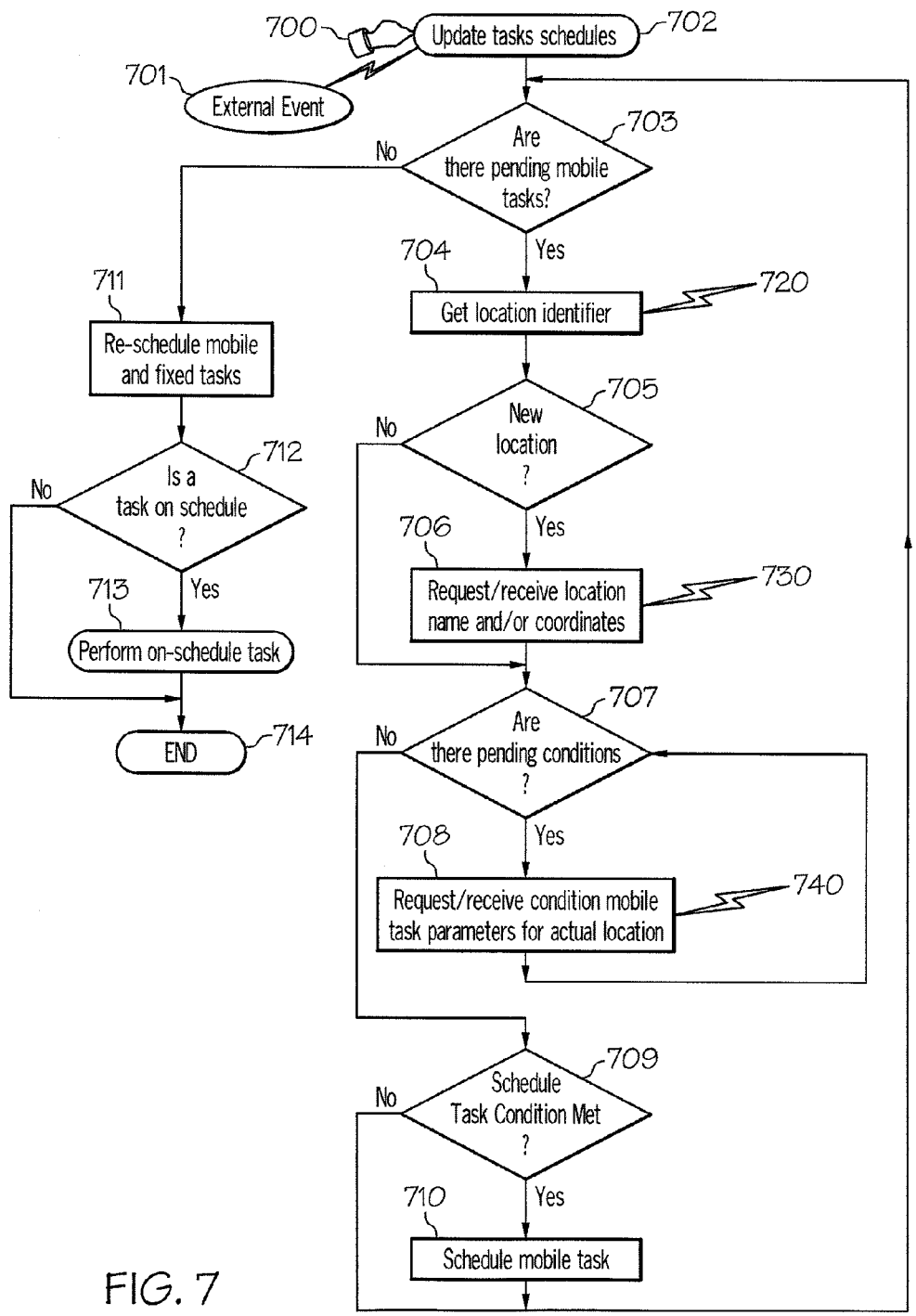
FIG. 7 illustrates the method for scheduling tasks for a mobile user.

FIG. 7 is a flow chart that shows aspects of the method for scheduling mobile tasks. The process of updating task schedules starts when either a user (700) manually defines or updates a task, or when an "event" (701) occurs as a result of an external phenomenon such as a mobile phone CELL-ID change. Applying the "English tourist" example shown in FIG. 2, the process of scheduling a mobile task starts when the tourist defines a task or when the CELL-ID of the mobile phone changes.

Once the process of updating task schedules is initiated, each mobile task that has not already been processed (703) is checked to determine whether or not the location has changed (705). Since the task requires the knowledge of the current physical location, a "get location identifier" (704) command may be sent (720) to the communication network, or to a location input device to obtain the required information. The "location identifier" (720) can be, for example, the CELL-ID of the GSM network.

From the received updated "location identifier" (704), the process determines whether or not the user has moved to a new location (705). If the user has moved to a new location, the coordinates (706) of the new location (which may include longitude, latitude, location name, and time zone) are retrieved. Retrieving (730) the new location coordinates can be performed via a local database that associates the "location identifier" with the "location coordinates," or via an information provider (107) accessible through the network (102). If the user has not moved to a new location, then there is no need to retrieve the location coordinates, since they are already known.

The method checks to determine whether there are any pending task conditions (707). As illustrated on FIG. 2, the task conditions of a mobile task (205) can be computed conditions or information dependent conditions. For example, the computed condition "Condition 1: at sunset" (205) can be calculated via an algorithm based on the current physical position of the user and the date. Information for an information dependent condition may be provided via an information provider (207). For example, in "Condition 2: Temperature less than 30 degrees," the outside temperature at the user's current location is needed. The temperature may be measured, or may be retrieved from an information provider (207) via the communication network (202). Depending on each condition (708), the required parameters may be manually entered by the user, or measured, computed, or retrieved (740) from an information provider.

In order to schedule a mobile task, the "task conditions" of the task must be met (709). After resolving all the task conditions, the conditions will be applied logically (AND, OR, IF-ELSE) together, and the result will determine whether the task conditions are met or not (709). As illustrated in the example shown in FIG. 2, the temperature must be less than 30 degrees in order to schedule the task "Take pictures at sunset" at "sunset time" (i.e., when the condition "sunset time" is met). If the task condition "temperature less than 30 degrees" is not fulfilled, the task "Take pictures at sunset" will not be scheduled. If the task conditions are met, the task is scheduled (710); otherwise, the task is not scheduled.

The process goes back again to check (703) whether there are any pending mobile tasks that have not been processed. After all the tasks have been processed, tasks that have a schedule time conflict are rescheduled (711). The reschedule depends on the priorities assigned to the tasks, and is intended to provide a feasible agenda to the user.

Each task is checked against its schedule (712), and tasks that are on schedule will then perform the appropriate action (713). Actions can be of any kind, such as displaying a message, sounding alarm, calling a number, and so forth. The process then ends (714).

Numerous other applications exist. Some are described below. Each of these applications uses basically the previously described method and system.

For example, the invention may be applied to shipping or sailing. Ships and boats entering or exiting a harbor, or anchoring near a shore, need to know in advance about the behavior of the tide. Based on the height of tide at the ship's current location, a particular activity can be scheduled. This activity can be also rescheduled at a different time or another day if, for example, the tide is too high or too low.

The invention may also be applied to hunting. Animal movement is thought to be loosely related to the moon's phase and ambient temperature. It could be better to schedule hunting based on the phase of the moon and on the temperature, which are dependent on the hunter's location. Likewise, the invention may be applied to fishing. It could be better to fish at a certain time of the day depending on sun's position, which, of course, varies with time based on the person's physical location on the earth. Thus the best schedule for fishing will depend on the location, and fishing times can be automatically rescheduled as the user moves from location to location.

The invention may be applied to astronomical observation. Objects such as the moon, the planets, the stars, and artificial satellites appear at different times or in different celestial positions depending on the observer's location. The present invention enables an observer to schedule observations that depend on time and terrestrial location.

The invention may be advantageously applied by adherents of Hinduism, which specifies dietary rules that are based on phases of the moon. For example, a traveling Hindu might use the invention to schedule dinners with friends. By means of the present invention, based on the person's current physical location, it is possible to determine and inform the user if there will be a full moon or a new moon, in which case the dinner might be rescheduled to a different day.

What has been described is merely illustrative of the application of the principles of the present invention. Other arrangements and methods can be implemented by those skilled in the art without departing from the spirit and scope of the present invention.

What is claimed is:

1. A system, comprising:
   a memory unit for storing a computer program for automatically scheduling tasks to be executed by a mobile user when conditions related to the mobile user's location are met; and
   a processor coupled to said memory unit, wherein said processor, responsive to said computer program, comprises:
   circuitry for defining at least one mobile task;
   circuitry for associating at least one task condition with each mobile task of said at least one mobile task, each task condition of said at least one task condition comprising at least one task parameter related to the location of the mobile user;
   circuitry for determining a current location of the mobile user;
   for said each task condition, circuitry for determining task parameters of said at least one task parameter related to the current location of the user, and circuitry for determining, according to the task parameters, whether the at least one associated task condition is met;

for said each mobile task, when associated task conditions of said at least one task condition are met, circuitry for computing a local time at which the at least one mobile task is to be executed; and circuitry for scheduling the mobile task;

circuitry for detecting a change in the location of the mobile user; and, responsive to detecting the change in the location of the mobile user:

circuitry for determining the current location of the mobile user; and, for said each task condition:

circuitry for determining the task parameters related to the current location of the user;

circuitry for determining whether or not the at least one task condition is met, according to the task parameters; and circuitry for updating the schedule of said each task by: computing a local time at which the at least one mobile task must be executed; scheduling the at least one mobile task when the associated task conditions are met; and canceling the schedule of the at least one mobile task when at least one associated task condition is not met.

2. A computer program product embodied in a computer readable storage medium, wherein the medium does not include a propagating signal, for automatically scheduling tasks to be executed by a mobile user when conditions related to the mobile user's location are met, the computer program product comprising the programming instructions for:

defining at least one mobile task;

associating at least one task condition with each mobile task of said at least one mobile task, each task condition of said at least one task condition comprising at least one task parameter related to the location of the mobile user;

determining a current location of the mobile user;

determining, for each task condition of said at least one task condition, task parameters of said at least one task parameter related to the current location of the user, and determining, according to the task parameters, whether associated task conditions of said at least one task conditions are met;

computing, for said each mobile task, when the associated task conditions are met, a local time at which the at least one mobile task is to be executed; and scheduling the at least one mobile task; and detecting a change in the location of the mobile user; and, responsive to detecting the change in the location of the mobile user:

determining the current location of the mobile user; and, for said at least one task condition:

determining the task parameters related to the current location;

determining whether or not the at least one task condition is met, according to the task parameters; and updating the schedule of said each task by: computing a local time at which the at least one mobile task must be executed; scheduling the at least one mobile task when the associated task conditions are met; and canceling the schedule of the at least one mobile task when the at least one associated task condition is not met.

3. A method for automatically scheduling tasks to be executed by a mobile user when conditions related to the mobile user's location are met, said method comprising:

defining at least one mobile task;

associating, by a processor, at least one task condition with each mobile task of said at least one mobile task, each task condition of said at least one task condition comprising at least one task parameter related to a location of the mobile user;

determining a current location of the mobile user;

for said each task condition, determining task parameters of said at least one task parameter related to the current location, and determining, according to the task parameters, whether associated task conditions of said at least one task condition are met; and for said each mobile task, when the associated task conditions are met, computing a local time at which the at least one mobile task is to be executed; and scheduling the at least one mobile task.

4. The method according to claim 3, wherein defining the at least one mobile task comprises defining task priorities for mobile tasks, and scheduling the mobile tasks according to their priorities in case of a scheduling conflict.

5. The method according to claim 3, wherein determining the current location of the mobile user comprises determining the current location of the mobile user from information transmitted via a wireless network to a wireless mobile device in possession of the mobile user.

6. The method according to claim 5, wherein determining the current location of the mobile user from the information transmitted via the wireless network network further comprises identifying a cell of the wireless network corresponding to the location of the wireless mobile device in possession of the mobile user.

7. The method according to claim 3, wherein determining the current location of the mobile user comprises determining the location name, longitude and latitude of the current location, and a time zone corresponding to the current location.

8. The method according to claim 3, wherein the tasks are scheduled on an electronic agenda or calendar.

9. The method according to claim 3, wherein defining the at least one mobile task comprises:

defining, for said each mobile task: means for identifying the task, the at least one task condition to be met to schedule the task, a task priority, and a task duration during which the task can be performed when the associated conditions are met; and defining, for said each task condition associated with the mobile task, a condition duration during which the task condition is valid.

10. A computer program product embodied in a computer readable storage medium, wherein the medium does not include a propagating signal, for automatically scheduling tasks to be executed by a mobile user when conditions related to the mobile user's location are met, the computer program product comprising the programming instructions for:

defining at least one mobile task;

associating at least one task condition with each mobile task of said at least one mobile task, each task condition of said at least one task condition comprising at least one task parameter related to a location of the mobile user;

determining a current location of the mobile user;

determining, for said each task condition, task parameters of said at least one task parameter related to the current location, and determining according to the task parameters, whether the at least one associated task condition is met; and computing, for said each mobile task, when associated task conditions of said at least one task condition are met, a local time at which the mobile task is to be executed; and scheduling the mobile task.

11. The computer program product according to claim 10, wherein the programming instructions for defining the at least one mobile task comprises the programming instructions for defining task priorities for mobile tasks of said at least one mobile task, and scheduling the mobile tasks according to their priorities in case of a scheduling conflict.

12. The computer program product according to claim 10, wherein the programming instructions for determining the current location of the mobile user comprises programming instructions for determining the current location of the mobile user from information transmitted via a wireless network to a wireless mobile device in possession of the mobile user.

13. The computer program product according to claim 12, wherein the programming instructions for determining the current location of the mobile user from the information transmitted via the wireless network further comprises programming instructions for identifying a cell of the wireless network corresponding to the location of the wireless mobile device in possession of the mobile user.

14. The computer program product according to claim 10, wherein the programming instructions for determining the current location of the mobile user comprises programming instructions for determining a location name, longitude and latitude of the current location, and a time zone corresponding to the current location.

15. The computer program product according to claim 10, wherein the tasks are scheduled on an electronic agenda or calendar.

16. The computer program product according to claim 10, wherein the programming instructions for defining the at least one mobile task comprises the programming instructions for:
   defining, for said each mobile task means for identifying the at least one task, the at least one task condition to be met to schedule the at least one task, a task priority, and a task duration during which the at least one task can be performed when the associated task conditions are met; and
   defining, for said each task condition associated with the mobile task, a condition duration during which the task condition is valid.

17. A system, comprising:
   a memory unit for storing a computer program for automatically scheduling tasks to be executed by a mobile user when conditions related to the mobile user's location are met; and
   a processor coupled to said memory unit, wherein said processor, responsive to said computer program, comprises:
      circuitry for defining at least one mobile task;
      circuitry for associating at least one task condition with each mobile task of said at least one mobile task, each task condition of said at least one task condition comprising at least one task parameter related to a location of the mobile user;
      circuitry for determining a current location of the mobile user;
      for said each task condition, circuitry for determining task parameters of said at least one task parameter related to the current location, and circuitry for determining, according to the task parameters, whether associated task conditions of said at least one task condition are met; and
      for said each mobile task, when the associated task conditions are met, circuitry for computing a local time at which the at least one mobile task is to be executed; and circuitry for scheduling the at least one mobile task.

18. The system as recited in claim 17, wherein said circuitry for defining the at least one mobile task comprises circuitry for defining task priorities for mobile tasks, and scheduling the mobile tasks according to their priorities in case of a scheduling conflict.

19. The system according to claim 17, wherein said circuitry for determining the current location of the mobile user comprises circuitry for determining the current location of the mobile user from information transmitted via a wireless network to a wireless mobile device in possession of the mobile user.

20. The system according to claim 19, wherein said circuitry for determining the current location of the mobile user from the information transmitted via the wireless network further comprises circuitry for identifying a cell of the wireless network corresponding to the location of the wireless mobile device in possession of the mobile user.

21. The system according to claim 17, wherein said circuitry for determining the current location of the mobile user comprises circuitry for determining the location name, longitude and latitude of the current location, and a time zone corresponding to the current location.

22. The system according to claim 17, wherein the tasks are scheduled on an electronic agenda or calendar.

23. The system according to claim 17, wherein said circuitry for defining the at least one mobile task comprises circuitry for:
   defining, for said each mobile task: means for identifying the task, the at least one task condition to be met to schedule the task, a task priority, and a task duration during which the task can be performed when the associated conditions are met; and
   defining, for said each task condition associated with the mobile task, a condition duration during which the task condition is valid.

* * * * *